United States Patent
Nordquist et al.

(10) Patent No.: US 7,728,841 B1
(45) Date of Patent: Jun. 1, 2010

(54) COHERENT SHADER OUTPUT FOR MULTIPLE TARGETS

(75) Inventors: Bryon Nordquist, Santa Clara, CA (US); Steven Molnar, Chapel Hill, NC (US)

(73) Assignee: NVIDIA Corporation, Santa Clara, CA (US)

(*) Notice: Subject to any disclaimer, the term of this patent is extended or adjusted under 35 U.S.C. 154(b) by 723 days.

(21) Appl. No.: 11/446,046

(22) Filed: Jun. 1, 2006

Related U.S. Application Data

(60) Provisional application No. 60/752,265, filed on Dec. 19, 2005.

(51) Int. Cl.
   *G06F 13/28* (2006.01)
   *G06F 15/16* (2006.01)
(52) U.S. Cl. ...................................... 345/533; 345/502
(58) Field of Classification Search .................. 345/502, 345/505, 506, 533
   See application file for complete search history.

(56) References Cited

U.S. PATENT DOCUMENTS

| | | | | |
|---|---|---|---|---|
| 5,794,016 A | * | 8/1998 | Kelleher | 345/505 |
| 7,184,059 B1 | * | 2/2007 | Fouladi et al. | 345/604 |
| 7,277,099 B2 | * | 10/2007 | Valmiki et al. | 345/589 |
| 2005/0231533 A1 | * | 10/2005 | Chen | 345/643 |

OTHER PUBLICATIONS

T. Gleerup, Gleerup, T.; Holten-Lund, H.; Madsen, J.; Pedersen, S., "Memory architecture for efficient utilization of SDRAM: a case study of the computation/memory access trade-off," Hardware/Software Codesign, 2000. Codes 2000. Proceedings of the Eighth International Workshop on , vol., no., pp. 51-55, 2000.*

* cited by examiner

*Primary Examiner*—Kee M Tung
*Assistant Examiner*—Carlos Perromat
(74) *Attorney, Agent, or Firm*—Townsend and Townsend and Crew LLP

(57) ABSTRACT

In a multiple render target mode, a pixel shader computes color values for pixels and stores the computed color values in a register file. The register file acts as a buffer for the computed color values. Conventionally writing pixels in the order they are received (pixel-major order) can result in large strides across memory in the frame buffer. At least a minimum amount of work should be done within a DRAM page, for example, to cover the overhead required in opening the DRAM page. Therefore, color values are written from the register file to two or more targets in a frame buffer in a target-major order within a segment. Writing in a target-major order (sequential with respect to targets but non-sequential with respect to quads received and processed) yields coherent writes to frame buffer memory and improves memory efficiency.

20 Claims, 8 Drawing Sheets

COHERENT SHADER OUTPUT FOR MULTIPLE TARGETS

CROSS-REFERENCE TO RELATED APPLICATIONS

The present application claims priority to U.S. Provisional Patent Application No. 60/752,265, filed Dec. 19, 2005, entitled "Parallel Array Architecture For a Graphics Processor," the disclosure of which is incorporated by reference herein as if set forth fully.

BACKGROUND OF THE INVENTION

The present invention relates in general to graphics processors, and in particular to systems and methods for writing graphics data for multiple (two or more) render targets from a graphics processor in a coherent fashion.

Graphics processing is an important feature of modern high-performance computing systems. In graphic processing, mathematical procedures are implemented to render (draw) graphic primitives such as triangles on a display to produce desired visual images. Real time graphics processing is based on the high-speed processing of graphic primitives to produce visually pleasing moving images.

Graphics processing is typically performed using an application program interface (API) that provides a standard software interface that can be run on multiple platforms, operating systems, and hardware. Examples of APIs include the Open Graphics Library (OpenGL), Direct3D, and DirectX10 (DX10). In general, APIs include a predetermined, standardized set of commands that are executed by associated hardware. For example, in a computer system that supports OpenGL, the operating system and application software programs make calls according to OpenGL without having to "know" any specifics regarding the system hardware and without concern as to how those commands will be implemented in the system hardware.

APIs are particularly beneficial when supported by dedicated hardware. High-speed processing of graphical images is often performed using special graphics processing units (GPUs). A GPU can be designed to rapidly process graphics commands for output to a target (e.g., a CRT display).

Recently, graphics APIs allow for output to multiple render targets (MRT). With MRT, the GPU renders graphics output to not just one output target, but to two or more (e.g., up to eight) output targets.

During multiple render target rendering, updates are performed on multiple targets. Deferred shading is one example of MRT. In deferred shading, multiple intermediate shading parameters are written by one shader as MRTs (e.g. diffuse and specular color, surface normal, etc.) with a secondary shader reading these intermediate values and performing the remainder of the shading processing.

BRIEF SUMMARY OF THE INVENTION

A limitation with MRT is that each render target or buffer is typically allocated as a contiguous region in memory. However, render targets are typically large enough that they lie in different DRAM pages. A minimum number of reads or writes to a particular DRAM page are desired to cover the "cost" or overhead of accessing the DRAM page. The cost of opening and closing DRAM pages is typically overhead of "dead" cycles in which the DRAM is not able to read or write useful data. Therefore, unless at least a minimum amount of work is done within each DRAM page, the overhead involved in opening and closing the DRAM pages reduces the overall efficiency of the GPU.

As described further herein, at least a minimum number of writes should be done within each opened DRAM page to use the DRAM efficiently; writing fewer than the minimum number in the opened DRAM page reduces overall memory throughput. Discontinuous writes to memory can result in a lack of coherence, or inefficiency, in memory accesses to the frame buffer.

In general, the present disclosure includes methods whereby writes are performed to a single target from a number of pixels, then writes are performed to the next target for the same pixels, and so forth.

In one aspect, therefore, a method of writing pixels to a frame buffer coupled to a first render target and a second render target of a plurality of render targets comprises computing a first color for the first render target in the pixel shader; computing a second color for the second render target in the pixel shader; buffering the first color and the second color in storage coupled to the pixel shader; and writing, independent of the pixel shader, the first color and the second color to the frame buffer in a target-major order.

Writing the first color may comprise writing to a substantially contiguous region in the frame buffer, and writing the second color may comprise writing to a second substantially contiguous region in the frame buffer, the second region discontinuous with the first region. The method may include, after writing the first color and the second color to frame buffer, freeing the storage used to buffer the first color and the second color. Writing may be based on at least a mapping between the first color and the first render target.

In another aspect, a method of writing pixels from a pixel shader executing in a graphics processing unit to a frame buffer coupled to the graphics processing unit, the frame buffer coupled to a first render target and a second render target of a plurality of render targets, comprises receiving into the pixel shader a plurality of pixels; computing a segment of first colors for the first render target and second colors for the second render target in the pixel shader; buffering the segment of first colors and second colors in storage coupled to the pixel shader; writing, independent of the shader, the entire segment of first colors to the first render target; and thereafter; writing, independent of the shader, the entire segment of second colors to the second render target.

In another aspect, a graphics processing system, comprises a raster unit configured to determine a set of pixels for a graphics primitive; a shader unit configured to receive the set of pixels in a pixel order, compute one or more color vectors for each of the set of pixels, and buffer the color vectors as a segment in a predetermined portion of a register coupled to the shader unit; a raster operations unit configured to blend the pixels and store the blended pixels into a frame buffer; a frame buffer configured to drive a first render target and a second render target; and a pixel controller configured to read the color vectors from the register independently of the shader unit and write the color vectors of the segment to the first target and to the second target in a target order.

DETAILED DESCRIPTION OF THE INVENTION

System Overview

Figure 1:
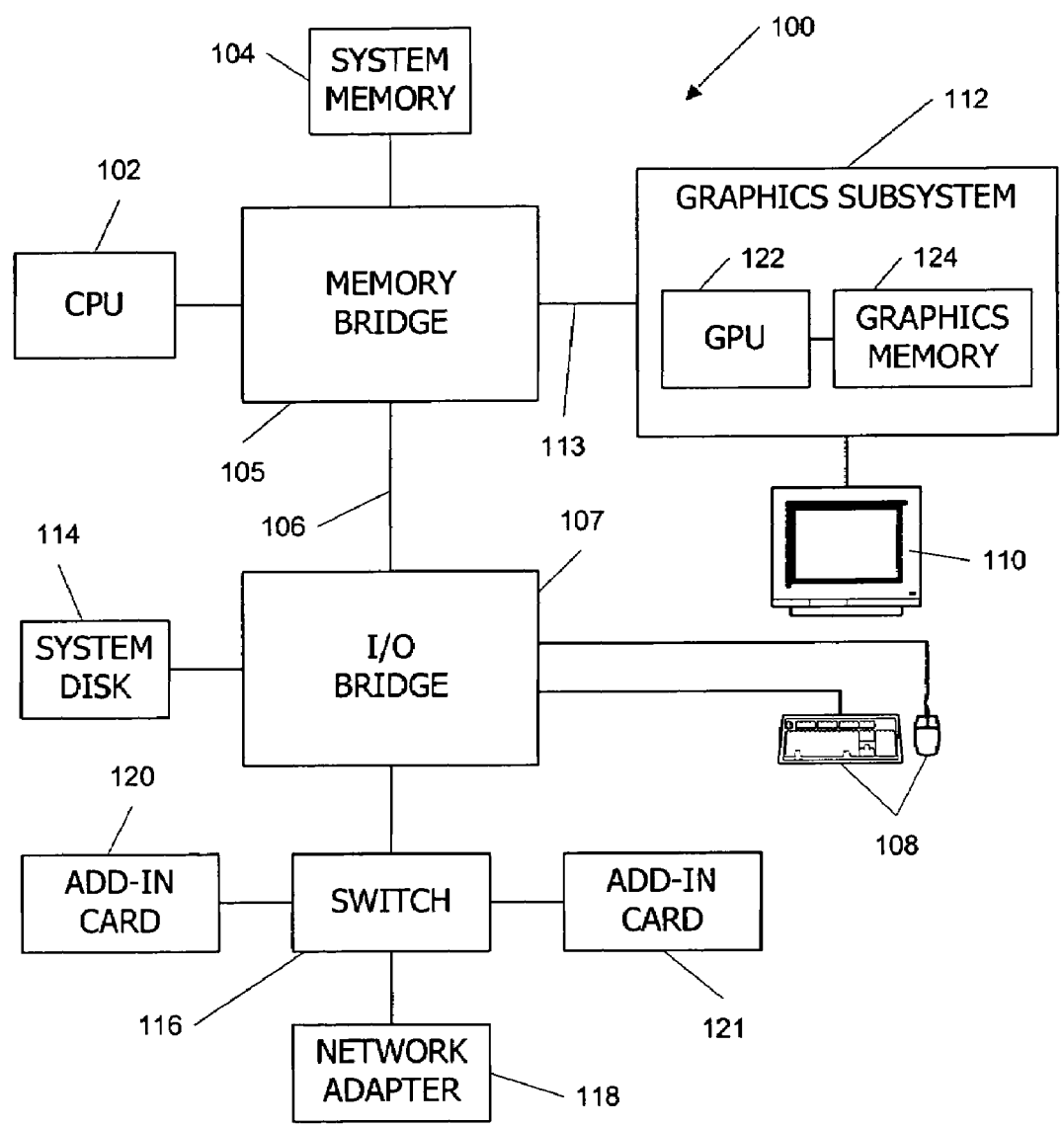
FIG. 1 is a block diagram of a computer system according to an embodiment of the present invention.

FIG. 1 is a block diagram of a computer system 100 according to an embodiment of the present invention. Computer system 100 is merely exemplary, and a number of alterations may be made to computer system 100. Computer system 100 includes a central processing unit (CPU) or control processor 102 and a system memory 104 communicating via a communications path that includes a memory bridge 105. Memory bridge 105 (e.g. a Northbridge chip) is connected via a communication path 106 (e.g., a point-to-point connection using the HyperTransport protocol) to an I/O (input/output) bridge 107. I/O bridge 107 (e.g. a Southbridge chip) receives user input from one or more user input devices 108 (e.g., keyboard, mouse) and forwards the input to CPU 102 via communication path 106 and memory bridge 105. Visual output is provided on a pixel based display device 110 (e.g., a CRT or LCD based monitor) operating under control of a graphics subsystem 112 coupled to memory bridge 105 via communication path 113, which may be implemented using, e.g., PCI Express (PCI-E), Accelerated Graphics Port (AGP), or any other point-to-point or bus protocol. A system disk 114 is also connected to I/O bridge 107. A switch 116 provides connections between I/O bridge 107 and other components such as a network adapter 118 and various add-in cards 120, 121. Other components (not explicitly shown), including USB or other port connections, CD drives, DVD drives, and the like, may also be connected to I/O bridge 107. In various embodiments, connections among system components may be implemented using suitable protocols such as PCI (Peripheral Component Interconnect), PCI-E, AGP, HyperTransport, or any other point-to-point or bus protocol(s), and connections between different devices may use different protocols as is known in the art.

Graphics processing subsystem 112 includes a graphics processing unit (GPU) 122 and a graphics memory 124, which may be implemented, e.g., using one or more integrated circuit devices such as programmable processors, application specific integrated circuits (ASICs), and memory devices. GPU 122 may be configured to perform various tasks related to generating pixel data from graphics data supplied by CPU 102 and/or system memory 104 via memory bridge 105 and bus 113, interacting with graphics memory 124 to store and update pixel data, and the like. For example, GPU 122 may generate pixel data from 2-D or 3-D scene data provided by various programs executing on CPU 102. GPU 122 may also store pixel data received via memory bridge 105 to graphics memory 124 with or without further processing. GPU 122 also includes a scanout module configured to deliver pixel data from graphics memory 124 to display device 110.

CPU 102 operates as the master processor of system 100, controlling and coordinating operations of other system components. In particular, CPU 102 issues commands that control the operation of GPU 122. In some embodiments, CPU 102 writes a stream of commands for GPU 122 to a command buffer, which may be in system memory 104, graphics memory 124, or another storage location accessible to both CPU 102 and GPU 122. GPU 122 reads the command stream from the command buffer and executes commands asynchronously with operation of CPU 102. The commands may include conventional rendering commands for generating images as well as general-purpose computation commands that enable applications executing on CPU 102 to leverage the computational power of GPU 122 for data processing that may be unrelated to image generation.

It will be appreciated that the system shown herein is illustrative and that variations and modifications are possible. The bus topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, graphics subsystem 112 is connected to I/O bridge 107 rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of GPU 122 to the rest of system 100 may also be varied. In some embodiments, graphics system 112 is implemented as an add-in card that can be inserted into an expansion slot of system 100. In other embodiments, a GPU is integrated on a single chip with a bus bridge, such as memory bridge 105 or I/O bridge 107.

A GPU may be provided with any amount of local graphics memory, including no local memory, and may use local memory and system memory in any combination. For instance, in a unified memory architecture (UMA) embodiment, no dedicated graphics memory device is provided, and the GPU uses system memory exclusively or almost exclusively. In UMA embodiments, the GPU may be integrated into a bus bridge chip or provided as a discrete chip with a high-speed bus (e.g., PCI-E) connecting the GPU to the bridge chip and system memory.

It is also to be understood that any number of GPUs may be included in a system, e.g., by including multiple GPUs on a single graphics card or by connecting multiple graphics cards to bus 113. Multiple GPUs may be operated in parallel to generate images for the same display device or for different display devices.

In addition, GPUs embodying aspects of the present invention may be incorporated into a variety of devices, including general purpose computer systems, video game consoles and other special purpose computer systems, DVD players, handheld devices such as mobile phones or personal digital assistants, and so on.

Rendering Pipeline Overview

Figure 2:
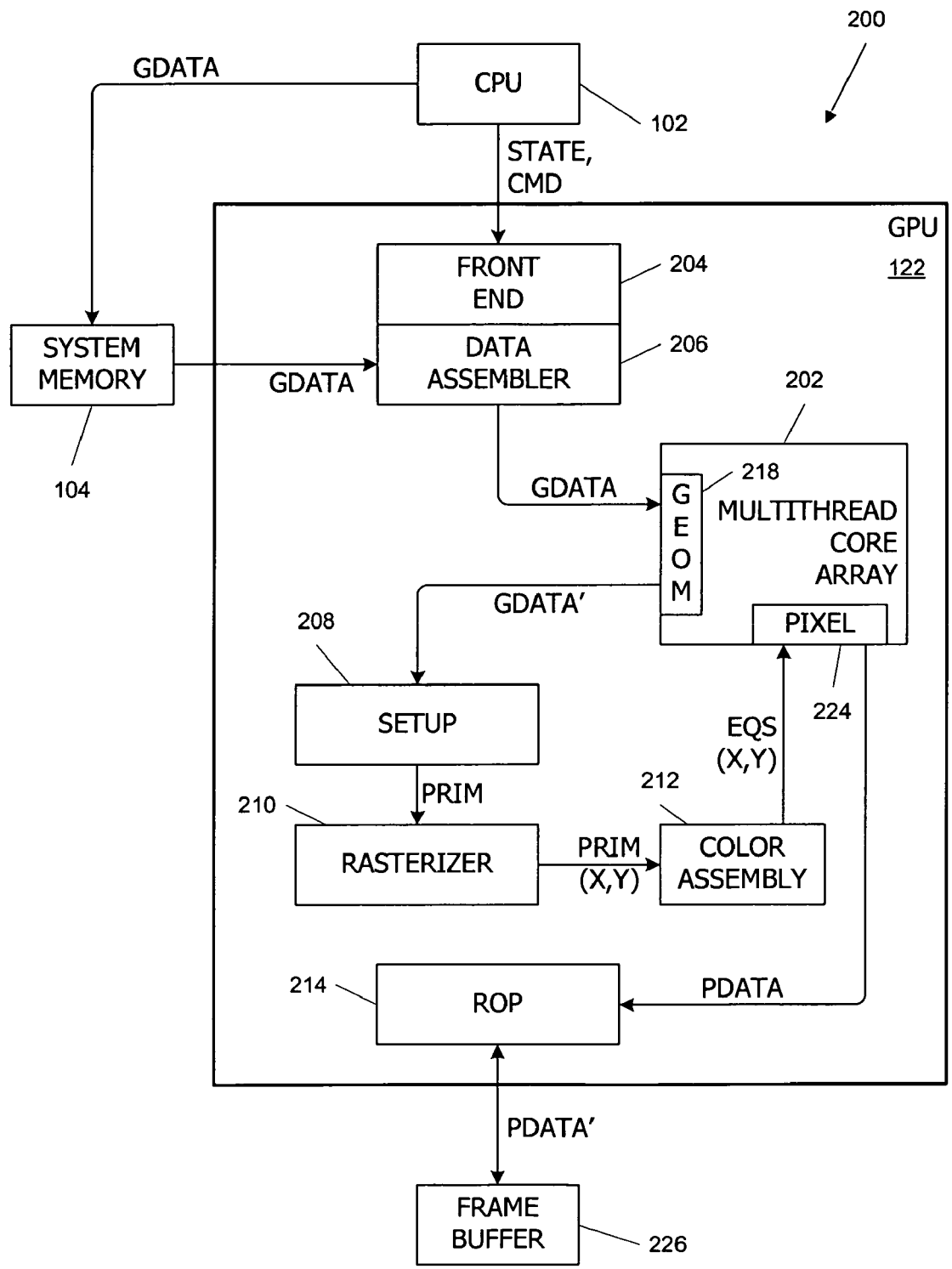
FIG. 2 is a block diagram of a rendering pipeline 200 that can be implemented in GPU 122 of FIG. 1 according to an embodiment of the present invention.

FIG. 2 is a block diagram of a rendering pipeline 200 that can be implemented in GPU 122 of FIG. 1 according to an embodiment of the present invention. Rendering pipeline 200 is implemented using an architecture in which applicable vertex shader programs, geometry shader programs, and pixel shader programs are executed using the same parallel-processing hardware, referred to herein as a "multithreaded core array" 202, described further below.

In addition to multithreaded core array 202, rendering pipeline 200 includes a front end 204 and data assembler 206, a setup module 208, a rasterizer 210, a color assembly module 212, and a raster operations module (ROP) 214. Front end 204 receives state information (STATE), rendering commands (CMD), and geometry data (GDATA), e.g., from CPU 102 of FIG. 1. The state information and rendering commands define processing parameters and actions for various stages of rendering pipeline 200. The state information, rendering commands, and geometry data define the desired rendered image or images, including geometry, lighting, shading, texture, motion, and/or camera parameters for a scene.

In some embodiments, rather than providing geometry data directly, CPU 102 provides references to locations in system memory 104 at which geometry data is stored; data assembler 206 retrieves the data from system memory 104. In one embodiment, the geometry data includes a number of object definitions for objects that may be present in the scene. Objects are modeled as groups of primitives (e.g., points, lines, triangles and/or other polygons) defined by reference to their vertices. For each vertex, a position is specified in an object coordinate system, representing the position of the vertex relative to the object being modeled. In addition, each vertex may have various other attributes specified on a per-vertex basis, for instance, scalar or vector attributes used to determine qualities such as the color, texture, transparency, lighting, shading, and animation of the vertex and its associated geometric primitives.

Primitives are generally defined by reference to their vertices, and a single vertex can be included in any number of primitives. In some embodiments, each vertex is assigned an index (which may be any unique identifier), and a primitive is defined by providing an ordered list of indices for the vertices making up that primitive.

Front end 204 directs the state information and rendering commands via a control path (not shown) to other components of rendering pipeline 200. For example, front end 204 directs geometry data to data assembler 206, which formats the geometry data and prepares it for delivery to geometry module 218 in multithreaded core array 202. Geometry module 218 directs programmable processing engines (not shown) in multithreaded core array 202 to execute vertex and/or geometry shader programs on the vertex data, with the programs being selected in response to the state information provided by front end 204.

The vertex and/or geometry shader programs can be specified by the rendering application, and different shader programs can be applied to different vertices and/or primitives. The shader program(s) to be used can be stored in system memory 104 or graphics memory 124 (FIG. 1) and identified to multithreaded core array 202 via suitable rendering commands and state information. In some embodiments, vertex shader and/or geometry shader programs can be executed in multiple passes, with different processing operations being performed during each pass. Each vertex and/or geometry shader program determines the number of passes and the operations to be performed during each pass. Vertex and/or geometry shader programs can implement algorithms using mathematical and logical operations on vertices and other data, and the programs can include conditional or branching execution paths and direct and indirect memory accesses. In some embodiments, vertex shader programs and geometry shader programs are executed using the same programmable processing engines in multithreaded core array 202. The processing engines can be multithreaded, and different threads executing different types of shader programs may be in flight concurrently in multithreaded core array 202.

After the vertex and/or geometry shader programs have executed, geometry module 218 passes the processed geometry data (GDATA') to setup module 208. Setup module 208 generates edge equations from the clip space or screen space coordinates of each primitive; the edge equations determine whether a point in screen space is inside or outside the primitive. Setup module 208 provides each primitive (PRIM) to rasterizer 210.

Rasterizer 210 determines which (if any) pixels are covered by the primitive, e.g., using scan-conversion algorithms. As used herein, a "pixel" (or "fragment") refers generally to a region in 2-D screen space for which a single color value is to be determined; the number and arrangement of pixels can be a configurable parameter of rendering pipeline 200 and might or might not be correlated with the screen resolution of a particular display device. Pixel color may be sampled at multiple locations within the pixel (e.g., using supersampling or multisampling techniques), and in some embodiments, supersampling or multisampling is handled within the pixel shader. After determining which pixels are covered by a primitive, rasterizer 210 provides the primitive (PRIM), along with a list of screen coordinates (X,Y) of the pixels covered by the primitive, to a color assembly module 212. Color assembly module 212 associates the primitives and coverage information received from rasterizer 210 with attributes (e.g., color components, texture coordinates, target normals) of the vertices of the primitive and generates equations defining some or all of the attributes as a function of position in screen coordinate space.

These attribute equations are usable in a pixel shader program to interpolate a value for the attribute at any location within the primitive. Color assembly module 212 provides the attribute equations (EQS) for each primitive that covers at least one pixel and a list of screen coordinates (X,Y) of the covered pixels to a pixel module 224 in multithreaded core array 202.

Pixel module 224 directs programmable processing engines (not shown) in multithreaded core array 202 to execute one or more pixel shader programs on each pixel covered by the primitive, with the program(s) being selected in response to the state information provided by front end 204. Pixel shader programs can be used to implement a variety of visual effects, including lighting and shading effects, reflections, texture blending, and procedural texture generation. Pixel shader programs are executed in multithreaded core array 202 using the same programmable processing engines that also execute the vertex and/or geometry shader programs. Thus, a given processing engine may operate as a vertex shader, a geometry shader, or a pixel shader. The multithreaded core array 202 can provide natural load-balancing: where the application is geometry intensive (e.g., many small primitives), a larger portion of processing cycles in multithreaded core array 202 will be devoted to vertex and/or geometry shaders, and where the application is pixel intensive (e.g., fewer and larger primitives shaded using complex pixel shader programs), a larger portion of processing cycles will tend to be devoted to pixel shaders.

Once processing for a pixel or group of pixels is complete, pixel module 224 provides the processed pixels (PDATA) to ROP 214. ROP 214 integrates the pixel values received from pixel module 224 with pixels of the image under construction in frame buffer 226, which may be located, e.g., in graphics memory 124. ROP 214 can mask pixels or blend new pixels with pixels previously written to the rendered image. Depth buffers, alpha buffers, and stencil buffers can determine the contribution (if any) of each incoming pixel to the rendered image. Pixel data PDATA' corresponding to the appropriate combination of each incoming pixel value and any previously stored pixel value is written back to frame buffer 226. Once the image is complete, frame buffer 226 can be scanned out to one or more display devices 110, as described further below.

It will be appreciated that the rendering pipeline described herein is illustrative and that variations and modifications are possible. The pipeline may include different units from those shown and the sequence of processing events may be varied from that described herein. For example, some operations described as performed by ROP 214 may be performed within pixel module 224 before the pixel data is forwarded to ROP 214.

Multithreaded Core Array Configuration

Figure 3:
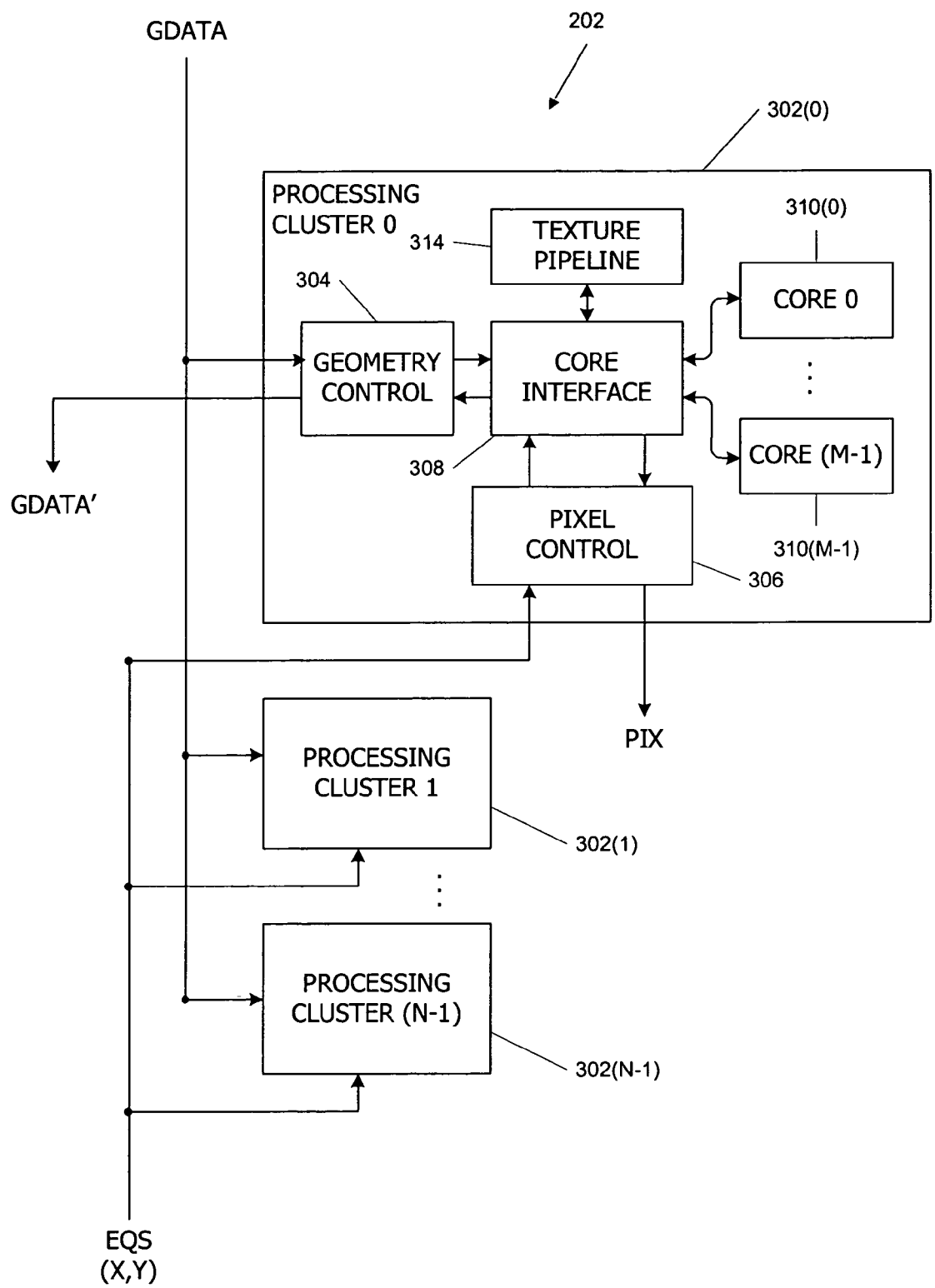
FIG. 3 is a block diagram of multithreaded core array 202 according to an embodiment of the present invention.

FIG. 3 is a block diagram of multithreaded core array 202 according to an embodiment of the present invention. Multithreaded core array 202 provides a highly parallel architecture that supports concurrent execution of a large number of instances of vertex, geometry, and/or pixel shader programs in various combinations. Multithreaded core array 202 includes some number (N) of processing clusters 302. Herein, multiple instances of like objects are denoted with reference numbers identifying the object and parenthetical numbers identifying the instance where needed. Any number N (e.g., 1, 4, 8, or any other number) of processing clusters may be provided. In FIG. 3, one processing cluster 302 is shown in detail; it is to be understood that other processing clusters 302 can be of similar or identical design.

Each processing cluster 302 includes a geometry controller 304 (implementing geometry module 218 of FIG. 2) and a pixel controller 306 (implementing pixel module 224 of FIG. 2). Geometry controller 304 and pixel controller 306 each communicate with a core interface 308. Core interface 308 controls a number (M) of cores 310 that include the processing engines of multithreaded core array 202. Any number M (e.g., 1, 2, 4 or any other number) of cores 310 may be connected to a single core interface 308. Each core 310 is a multithreaded execution core capable of supporting a large number (e.g., 100 or more) of concurrent execution threads (where the term "thread" refers to an instance of a particular program executing on a particular set of input data), including vertex threads, geometry threads, and pixel threads, as described further below with reference to FIG. 4.

Core interface 308 also controls a texture pipeline 314 that is shared among cores 310. Texture pipeline 314 includes logic circuits configured to receive texture coordinates, to fetch texture data corresponding to the texture coordinates from memory, and to filter the texture data according to various algorithms. When a core 310 encounters a texture instruction, it provides the texture coordinates to texture pipeline 314 via core interface 308. Texture pipeline 314 processes the texture instruction and returns the result to the core 310 via core interface 308.

Geometry controller 304 forwards the received geometry data GDATA to core interface 308, which loads the data into core 310 and instructs core 310 to launch the appropriate vertex shader program and/or geometry shader program. After completion of the vertex shader program and/or geometry shader program, geometry controller 304 provides the processed geometry data (GDATA') to setup module 208 of FIG. 2.

At the pixel stage, color assembly module 212 (FIG. 2) provides attribute equations EQS for a primitive and pixel coordinates (X,Y) of pixels covered by the primitive to the selected processing clusters 302. Pixel controller 306 loads pixel data into a core 310, then instructs the core 310 to launch the pixel shader program. Upon completion of the pixel shader program, core interface 308 delivers the processed pixel data to pixel controller 306, which forwards the pixel data PDATA to ROP unit 214 (FIG. 2), as described further below with respect to FIGS. 5 to 8.

It will be appreciated that the multithreaded core array described herein is illustrative and that variations and modifications are possible. Any number of processing clusters may be provided, and each processing cluster may include any number of cores.

Core Architecture

Figure 4:
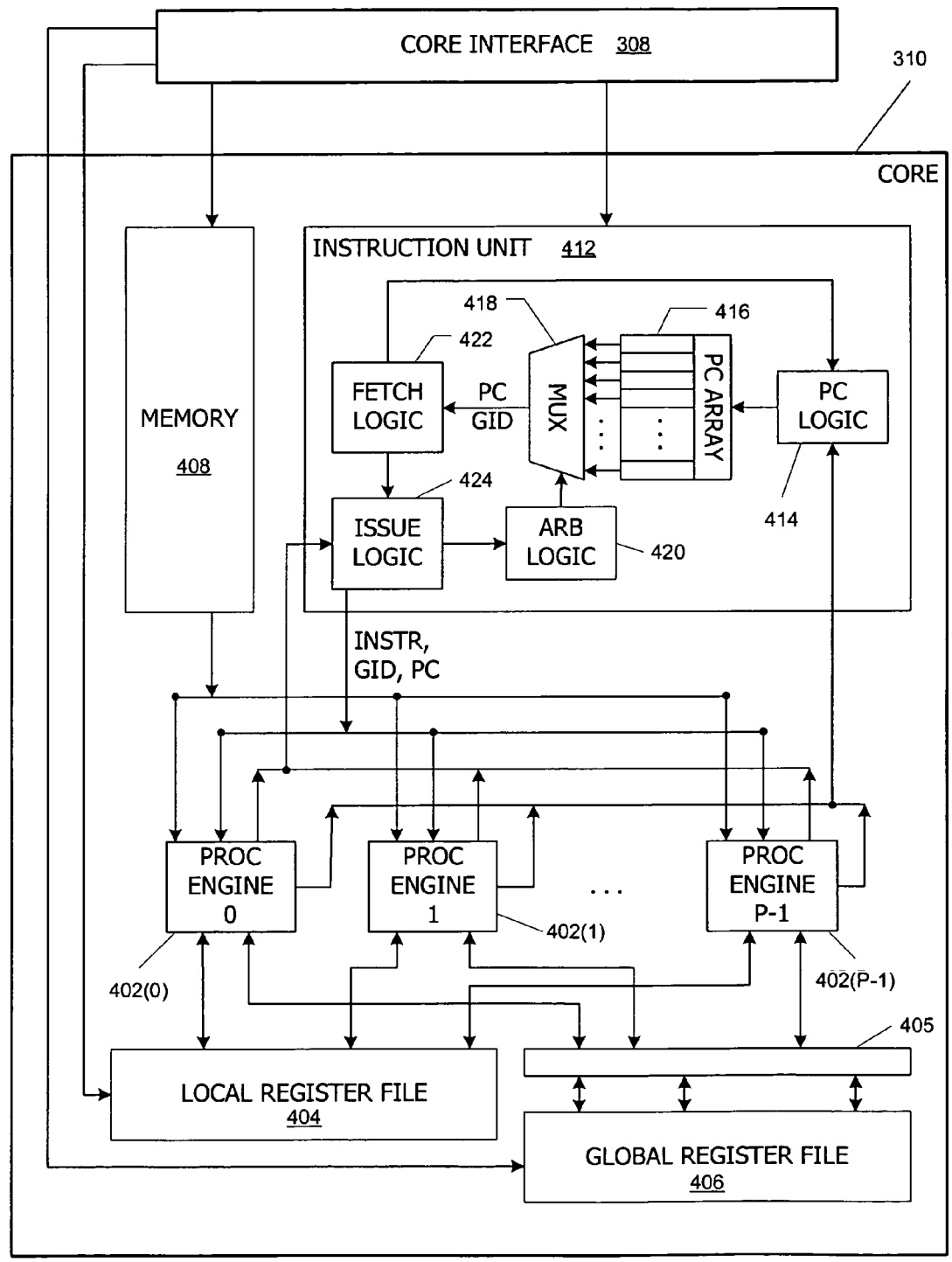
FIG. 4 is a block diagram of a core 310 configured to execute a large number of threads in parallel according to an embodiment of the present invention.

FIG. 4 is a block diagram of a core 310 configured to execute a large number of threads in parallel according to an embodiment of the present invention. In some embodiments, single-instruction, multiple-data (SIMD) instruction issue techniques are used to support parallel execution of a large number of threads without providing multiple independent instruction fetch units.

In one embodiment, core 310 includes an array of P (e.g., 16) parallel processing engines 402 configured to receive SIMD instructions from a single instruction unit 412. Each parallel processing engine 402 includes an identical set of functional units (e.g., arithmetic logic units, etc.). The functional units may be pipelined, and support operations including integer and floating point arithmetic (e.g., addition and multiplication), comparison operations, Boolean operations (AND, OR, XOR), bit-shifting, and various algebraic functions.

Each processing engine 402 is allocated space in a local register file 404 for storing its local input data, intermediate results, and the like. In one embodiment, local register file 404 is physically or logically divided into P lanes, each having some number of entries (where each entry might be, e.g., a 32-bit word). One lane is allocated to each processing unit, and corresponding entries in different lanes can be populated with data for corresponding thread types to facilitate SIMD execution. The number of entries in local register file 404 is large enough to support multiple concurrent threads per processing engine 402.

Each processing engine 402 also has access, via a crossbar switch 405, to a global register file 406 that is shared among all of the processing engines 402 in core 310. Some embodiments also provide an on-chip shared memory 408. On-chip memory 408 stores data expected to be used in multiple threads, such as coefficients of attribute equations in pixel shader programs.

In one embodiment, each processing engine 402 is multi-threaded and can execute up to some number G (e.g., 24) of threads concurrently, e.g., by maintaining current state information associated with each thread in a different portion of its allocated lane in local register file 406. Processing engines 402 may switch rapidly from one thread to another. Instruction unit 412 is configured, for any given processing cycle, to issue the same instruction (INSTR) to all P processing engines 402. Thus, at the level of a single clock cycle, core 310 implements a P-way SIMD microarchitecture.

Because instruction unit 412 issues the same instruction to all P processing engines 402 in parallel, core 310 is advantageously used to process threads in "SIMD groups." As used herein, a "SIMD group" refers to a group of up to P threads of execution of the same program on different input data, with one thread of the group being assigned to each processing engine 402. Instruction unit 412 includes program counter (PC) logic 414, a program counter register array 416, a multiplexer 418, arbitration logic 420, fetch logic 422, and issue logic 424. Program counter register array 416 stores program counter values (one per SIMD group), which are updated independently of each other by PC logic 414. PC logic 414 updates the PC values based on information received from processing engines 402 and/or fetch logic 422.

Pixel Shader Coupling to Frame Buffer

In some embodiments, rather than the centralized ROP 214 suggested in FIG. 2, each pixel controller 306 in FIG. 3 includes its own ROP that communicates pixels to frame buffer 226 of FIG. 2. In such embodiments, a coupling from processing clusters 302 to the frame buffer is provided. In one embodiment with N processing clusters, frame buffer 226 is partitioned into N partitions. Each cluster 302 is coupled to a different one of the N partitions.

Figure 5:
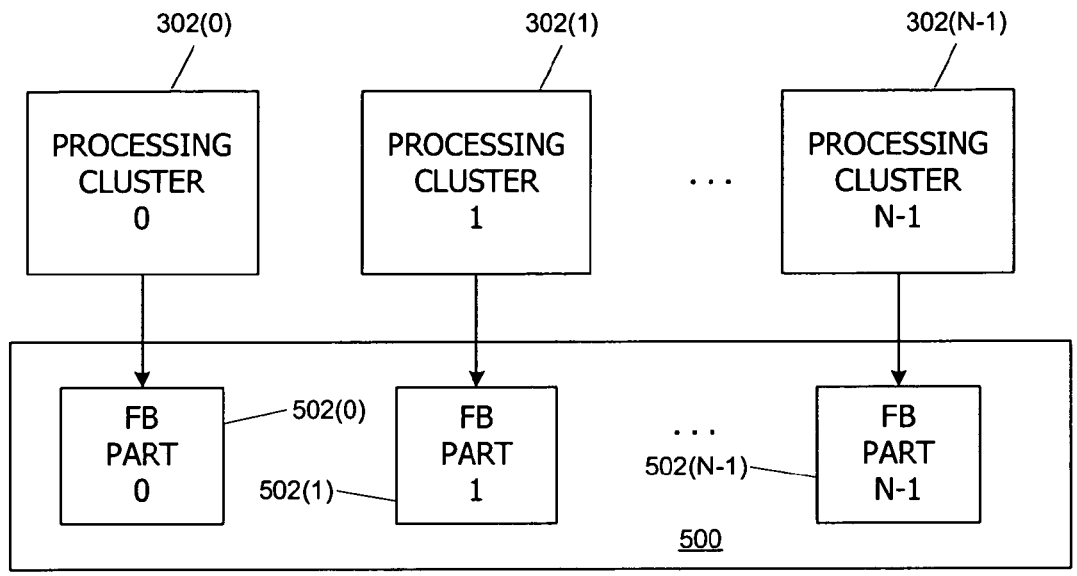
FIG. 5 is a simplified block diagram illustrating a coupling between processing clusters 302 and a frame buffer 500 according to an embodiment of the present invention.

FIG. 5 is a simplified block diagram illustrating a coupling between processing clusters 302 and a frame buffer 500 according to an embodiment of the present invention. It is to be understood that frame buffer 226 of FIG. 2 might include multiple frame buffers 500, where each frame buffer 500 stores a specified quantity on a per-pixel basis for the same image. For instance, in one embodiment, frame buffer 226 includes a Z buffer; color component buffers (e.g., for red, green and blue color components); and a transparency (alpha) buffer. It is to be understood that any number of frame buffers 500 may be provided and that "pixel" as used herein refers to sampling locations within the image, which might or might not correspond to the number of active pixels in a given display device 110 (FIG. 2). For simplicity, only one frame buffer 500 is shown; it is to be understood that the same partitioning can be applied to each frame buffer for an image. Further, it is to be understood that although color components may be described as stored in separate buffers, color components, such as red, green, blue, and alpha are typically stored in the same buffer, rather than having a buffer per component. The multiple buffers in MRT rendering typically store different colors or other pixel attributes, rather than different color components.

Frame buffer 500 is partitioned (physically or logically) into N partitions 502, with each partition being large enough to store the data for at least 1/N of the pixels in the image. Each of the N processing clusters 302 is coupled to one of the N partitions 502. Thus, processing cluster 302(0) stores all of its output pixel data in partition 502(0), processing cluster 302(1) in partition 502(1) and so on.

Not shown in FIG. 5 is a memory interface (also referred to as a memory controller) between processing clusters 302 and frame buffer 500. As is known in the art, a memory interface is a functional block that provides one or more gateways to off-chip memory. Whenever any of the cores 302 needs to access frame buffer 500, the core 302 does so with the memory interface. The memory interface may be a single memory interface with multiple channels, may comprise multiple memory interface units, and may be partitioned into portions within and outside of multithreaded core array 202. For example, in some embodiments, the memory interface includes a on-chip (local) memory controller to access frame buffer 500.

Figure 6:
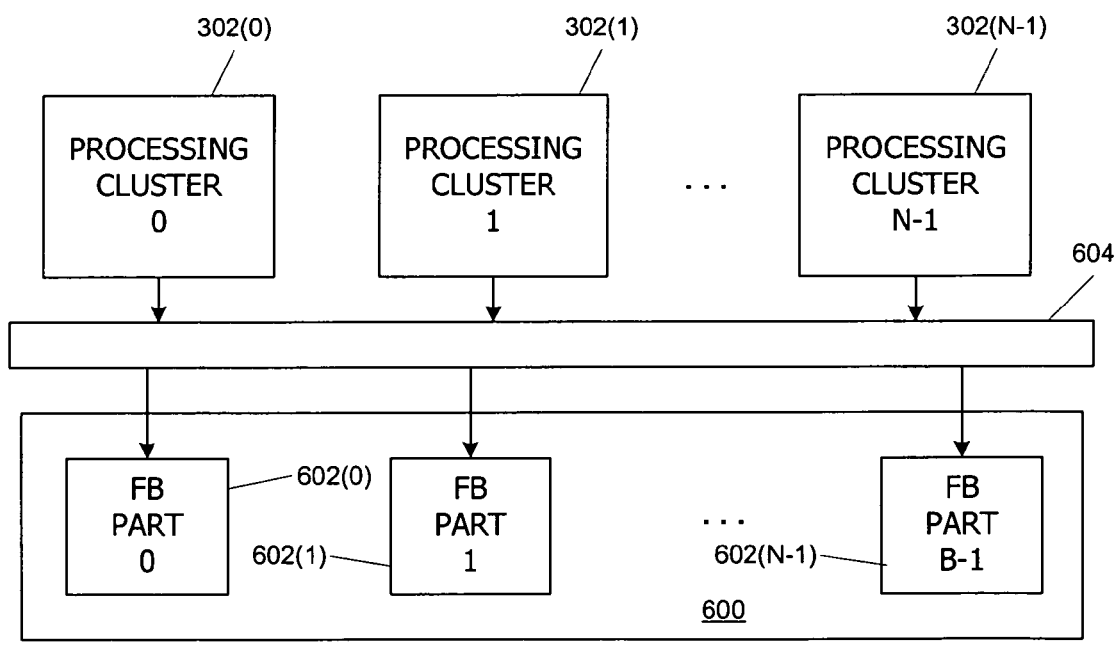
FIG. 6 is a simplified block diagram illustrating a coupling between processing clusters 302 and a frame buffer 600 according to an embodiment of the present invention.

In an alternative embodiment, each processing cluster can access multiple frame buffer partitions. FIG. 6 is a simplified block diagram illustrating a coupling between processing clusters 302 and a frame buffer 600 according to an embodiment of the present invention. It is to be understood that frame buffer 226 of FIG. 2 might include multiple frame buffers 600, where each frame buffer 600 stores a specified quantity on a per-pixel basis for the same image as described above with reference to frame buffer 500. It is to be understood that any number of frame buffers 600 may be provided. For simplicity, only one frame buffer 600 is shown; it is to be understood that the partitioning can be applied to each frame buffer for an image. Also for simplicity, not shown is a memory interface between processing clusters 302 and frame buffer 600.

Frame buffer 600 is partitioned (physically or logically) into a number B of partitions 602, where B might be equal to or different from the number N of processing clusters 302. Processing clusters 302 are coupled to partitions 602 via a crossbar 604. Each cluster 302 can write pixel data to any one (or more) of the B partitions 602.

In this embodiment, crossbar 604 is configurable, allowing the coupling of processing clusters 302 to frame buffer partitions 602 to be modified as desired. For example, as noted above, in some embodiments, fewer than all of processing cores 302 might be used to generate pixels. In the embodiment shown in FIG. 6, if processing core 302(0) is disabled, crossbar 604 can be reconfigured so that all frame buffer partitions 602 are still accessible to one or another of processing cores 302. The display (scanout) logic is advantageously configurable such that the frame buffer data is correctly scanned out regardless of the configuration of crossbar 604 or the assignment of processing cores 302.

Where multiple frame buffers are present (e.g., Z, color, alpha, etc.), each frame buffer may be partitioned into B partitions in the manner described. In some embodiments, the number of partitions is not the same for all frame buffers; for instance, a Z buffer might have more or fewer partitions than a color buffer. Further, as described above, color components, such as red, green, blue, and alpha may be stored in the same buffer, rather than having a buffer per component.

Pixel Shader Coupling to Frame Buffer

Figure 7:
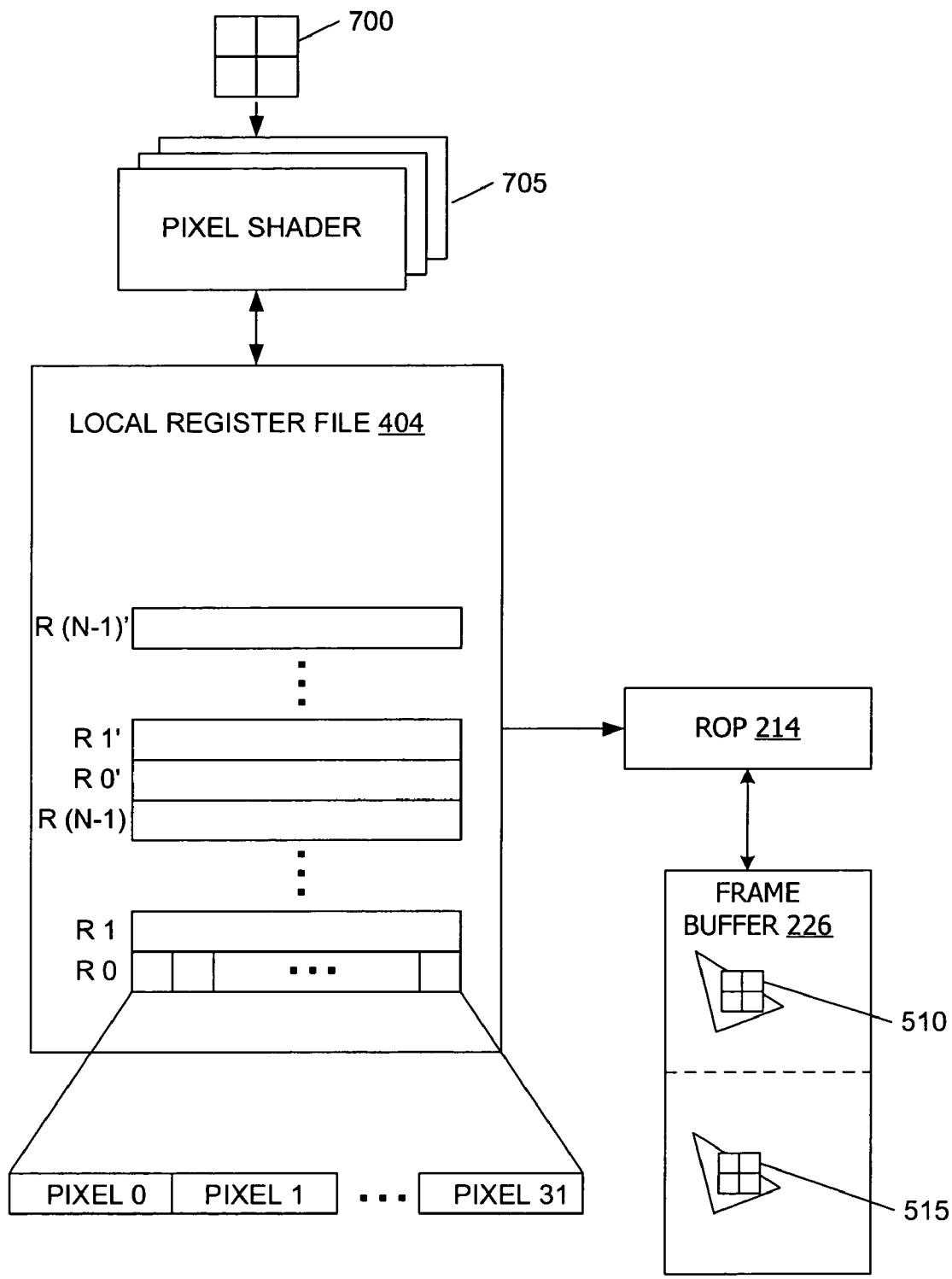
FIG. 7 is a diagram depicting data flow from instances of a pixel shader (PS) program 705 to multiple render targets in frame buffer 226, including details of storage in local register file 404 of FIG. 4 in one embodiment in accordance with the present invention.

FIG. 7 is a diagram depicting data flow from instances of a pixel shader (PS) program 705 to multiple render targets in frame buffer 226, including details of storage in local register file 404 of FIG. 4 in one embodiment in accordance with the present invention. As described above, rendering pipeline 200 processes a primitive to generate one or more image pixels, using multithreaded core array 202 to execute threads of a vertex shader (VS) program, a geometry shader (GS) program, and a pixel shader (PS) program. To focus on coherent shader output for multiple targets, only the PS 705 program is described further below. Further details related to other aspects of rendering operations in pipeline 200 may be found in U.S. patent application Ser. No. 11/290,303, "Multi-threaded Parallel Processor with launching of Groups of Threads," filed Nov. 29, 2005; the contents of which application is incorporated by reference herein as if set forth fully.

Referring to FIGS. 3, 4, and 7, pixel controller 306 in one embodiment loads "quads" 700 into pixel shader 705. Quads are 2×2 pixel blocks having components that are processed together. However, using quads is not a requirement of the present invention.

The quads provided by pixel controller 306 are loaded into a PS input buffer in a selected core 310. The PS input buffer is a region within local register file 404 in the selected core 310. In some embodiments, pixel controller 306 dynamically allocates PS input buffer space as quads are received as described further below. A separate PS input buffer may be provided in each core 310.

After enough pixel data to support a SIMD group of PS 705 threads has been loaded into the PS 705 input buffer, pixel controller 306 launches the SIMD group. Core 310 executes the SIMD group of PS 705 as a group of threads to process the quads of pixels. With parallel processing in the SIMD group, multiple quads (e.g. 8, 16, etc.) may be shaded by PS 705 simultaneously, in parallel.

As shown in FIG. 7, local register file 404 provides a SIMD-style register file for PS 705. For example in some embodiments, local register file 404 is an on-chip high speed RAM that includes 256 rows, where each row of 1024 bits is organized into 32 pixels, with 32 bits of resolution per pixel. For example, the first pixel may comprise the leftmost 32 bits of register R0, the next pixel may comprise the next contiguous 32 bits of R0, and so on, so that the R0 register includes 32 pixels.

The registers in local register file 404 may be used as temporary storage during processing of PS 705. For example, if PS 705 includes instructions to add registers R0 and R1 together and put the result in register R2, then PS 705 reads out 32 pixels from R0, 32 pixels from R1, feeds those R0 and R1 values into 32 independent adders to perform 32 parallel add operations in one clock cycle, and then writes the 32 results into register R2.

During processing of PS 705, local register file 404 may be allocated to threads in "segments" of size N. For example, a first instance of PS 705 may operate on registers R0 to R(N−1), and a second instance of PS 705 may operate on registers R0' to R(N−1)'. Additional instances of PS 705 may operate on subsequent register groups until there is insufficient free space remaining in local register file 404, at which point rasterizer 210 (FIG. 2) may need to be stalled until the PS 705 threads complete shading operations and space in local register file 404 is freed for use by other threads, as described further below.

In one embodiment, when execution of the SIMD group of PS 705 threads is complete, PS 705 threads store their output data in local register file 404, and pixel controller 306 is notified. Core 310 sends a "done" signal to core interface 308 upon completing execution of the PS 705 program, and core interface 308 forwards the signal to pixel controller 306.

Upon completion of PS 705, local register file 404 contains final color values to be written out to frame buffer 226. For a color vector with components in red, green, blue, and alpha, register R0 contains red color values for pixels 0 to 31, register R1 contains green color values for pixels 0 to 31, register R2 contains blue color values for pixels 0 to 31, and register R3 contains alpha values for pixels 0 to 31. Similarly, if generating multiple colors in one instance of PS 705, a second color vector is contained in the next four registers, R4 through R7, and so on for subsequent color vectors. Therefore, a color vector for a single pixel occupies a portion of a column of local register file 404 (e.g., the color vector for pixel 0 comprises the leftmost 32 bits of registers R0-R3).

Although described with respect to red, green, blue, alpha, with 32 bits resolution for each, other color vector organizations are possible in local register file 404. For example, the color format can be four color channels (red, green, blue, and alpha) with each channel in 8 bits for a total of 32 bits. The color format may be just red and green, each with 16 bits, for higher precision color components.

As described further below with respect to FIGS. 8 and 9, after processing by PS 705 completes, registers in local register file 404 act as buffers holding fully-processed color values that have not yet been sent to ROP 214 and/or frame buffer 226. Depending upon a mapping of colors to targets, pixels may be coherently written out of local register file 404 to one or more targets (e.g., targets 510 and 515 in frame buffer 226. Only after the color values have been written to ROP 214 and/or frame buffer 226 will pixel controller 306 free up space in local register file 404 for use by other processes. Pixel controller 306 is programmed to not reallocate registers in local register file 404 until all of the colors have been "drained out" of the registers.

Although referred to as buffering in local register file 404, buffering may be performed in any storage location. For example, in some embodiments, storage is provided to store colors in a cache.

Mapping Colors to Targets

Graphics API's support various mappings of colors to targets. In a simple case, a 1-to-1 mapping provides for one color to be mapped to one target. In a 1-to-many mapping, one color is mapped to many (e.g., up to 8) targets simultaneously. Similarly, many 1-to-1 mappings may be provided in the API. In addition, multithreaded core array 202 supports a 2-to-many mapping, whereby PS 705 outputs two individual colors and ROP 214 can perform a relatively sophisticated blending of the colors.

Figure 8:
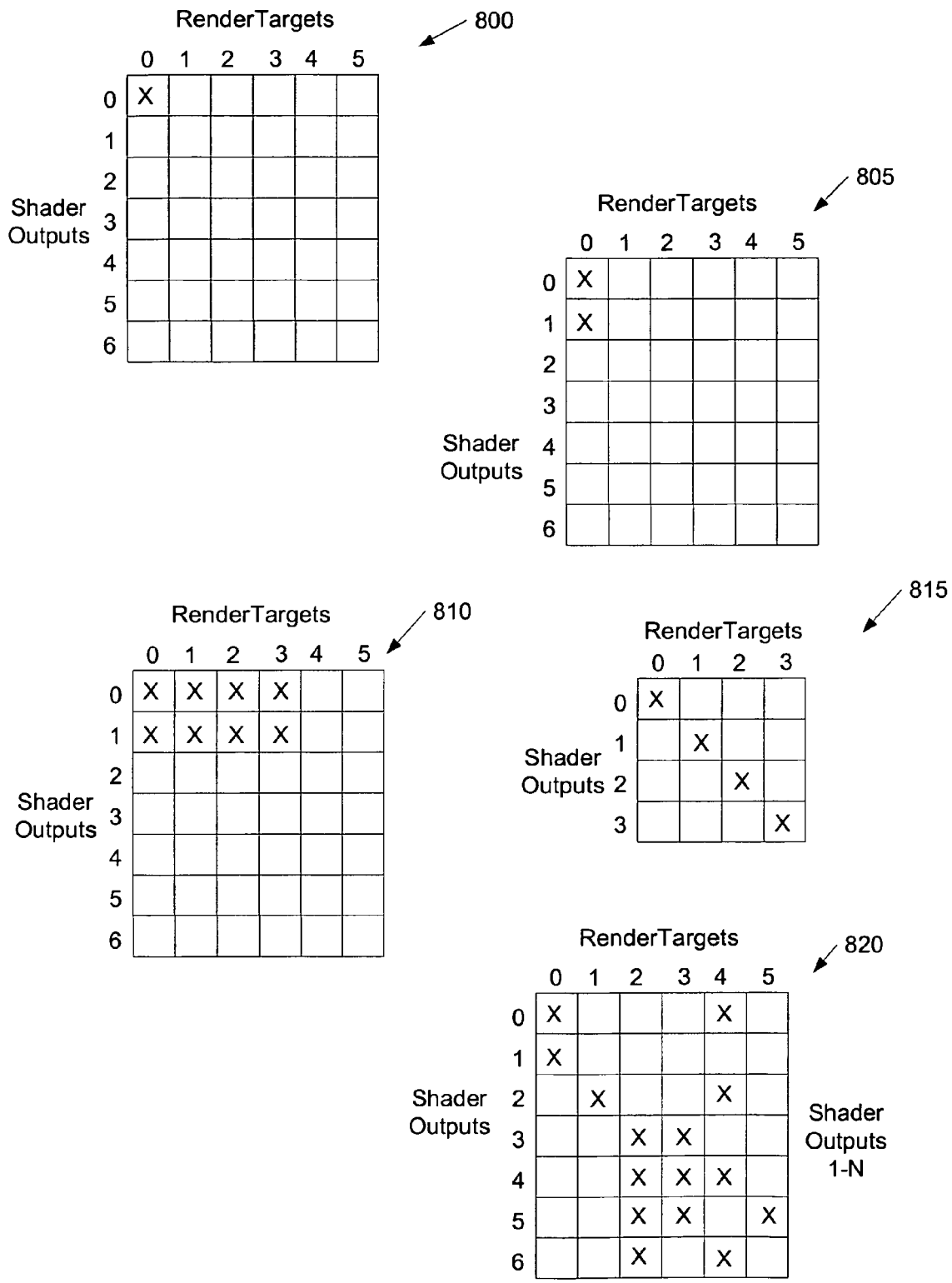
FIG. 8 illustrates several exemplary mappings for shader outputs (colors or color vectors) of PS 705 to render targets in ROP 214 and frame buffer 226 of FIG. 7 in embodiments of the present invention.

FIG. 8 illustrates several exemplary mappings for shader outputs (colors or color vectors) of PS 705 to render targets in ROP 214 and frame buffer 226 of FIG. 7 in embodiments of the present invention. In various embodiments, the mappings 800, 805, 810, 815, and 820 represent state information that may be dynamically programmed into hardware or used to dynamically program states into pixel controller 306 of FIG. 3. The mapping may be used to determine how shader outputs of PS 705 are written to ROP 214 so that ROP 214 may optionally blend a subset of the shader outputs into a final color that gets written to one or more targets (also referred to as destinations) in frame buffer 226.

In general, the mappings 800, 805, 810, 815, and 820 map N (e.g. up to 7) shader outputs of PS 705 to M (e.g. up to 6 or 8) render targets in frame buffer 226. There is no particular limit to the values N and M.

Mapping 800 represents a 1-to-1 mapping of a single source to a single destination. With mapping 800, PS 705 generates one color vector for each quad and the color vector is mapped to a single destination in ROP 214 and frame buffer 226. Although depicted as a table with N=7 and M=6, mapping 800 can be represented by a single state value (N=1, M=1).

Mapping 805 represents a 2-to-1 mapping (dual source blending), where two source colors are mapped to one destination target in ROP 214 and frame buffer 226. According to mapping 805, PS 705 would output two color vectors to ROP 214. ROP 214 would blend the two color vectors into one color vector and write the blended color vector to a single target destination in frame buffer 226. Although depicted as a table with N=7 and M=6, mapping 805 can be represented by 2-by-1 matrix (N=2, M=1).

Mapping 810 represents a dual source blending in ROP 214 with four output destinations in frame buffer 226. The four output destinations may be used for example, in a 3D virtual reality graphic rendering application with separate left eye and right eye displays, where each eye also has a front buffer and a back buffer. In other words, the four output destinations in frame buffer 226 may correspond to left front, left back, right front, and right back. In this example, mapping 810 is used to map PS 705 output of two color vectors to ROP 214. ROP 214 would blend the color vectors into one blended color vector, and ROP 214 would write to four destination targets in frame buffer 226. Because the same color vector is written to four destination targets in frame buffer 226, each display would show the same image, which may be advantageous in an initialization of the virtual reality application, for example.

Mapping 815 represents many 1-to-1 mappings (N=4, M=4). In this case, corresponding to a DX10 mapping of generating one color vector per render target, each color (e.g., color 0) is potentially different from all other colors (e.g., color 2). Continuing the 3D virtual reality example, such a mapping would be advantageous when each of the left front, left back, right front, and right back targets are programmed with different views, for example in a rapidly changing portion of a video game.

Note that blending is independent of MRT rendering. For example, a single output color vector may be written to multiple render targets in frame buffer 226 without blending in ROP 214 (in which case N=1, M=4).

Mapping 820 represents a complex mapping with numerous shaders mapped to numerous outputs. Each cell of mapping 820 may represent a complex algorithmic computation applied to colors to be written to multiple targets in frame buffer 226. For example, colors 0 and 1 may be blended together in ROP 214 and written to target 0 in frame buffer 226. A straight copy of color 2 may be mapped to target destination 1 in frame buffer 226. Render target number 2 might be mapped with an algorithm to be applied to colors 3-6, for example a sum of colors 3 and 4, the sum of colors 3 and 4 multiplied a factor, added to color 6, with the result mapped to target 2 in frame buffer 226. Target 3 might result from another computation, for example a sum of colors 3 and 4, the sum of colors 3 and 4 multiplied a factor, but without the addition of color 6, with the result mapped to target 3 in frame buffer 226. Target 4 might result from an algorithm and mapping of the average of every color 0, 2, 4, and 6. Target 5 might result from an algorithm and mapping of color 5 times a constant.

With the exemplary mappings described with respect to FIG. 8, state information can be used to program various combinations of colors from PS 705, processing in ROP 214, and output to one or more targets in frame buffer 226. The mappings may rapidly change according to the application program running on CPU 102 (FIG. 2). The mappings may define additional processing to be applied to the colors before the colors are written to the targets in frame buffer 226, and provide tremendous flexibility for mapping the outputs from PS 705 of FIG. 7 to frame buffer 226.

Coherent Output to Frame Buffer

The mappings described with respect to FIG. 8 control the methods by which colors are written out of local register file 404 into ROP 214 and frame buffer 226 by pixel controller 306.

Pixel controller 306 is programmed to not reallocate registers in local register file 404 until all of the colors have been "drained out" of the registers. Only after the color values have been sent to ROP 214 and/or frame buffer 226 will pixel controller 306 free up space in local register file 404 for use by other processes. As described further below, registers in local register file 404 act as buffers, holding fully-processed color values that have not yet been sent to ROP 214 and/or frame buffer 226.

Figure 9:
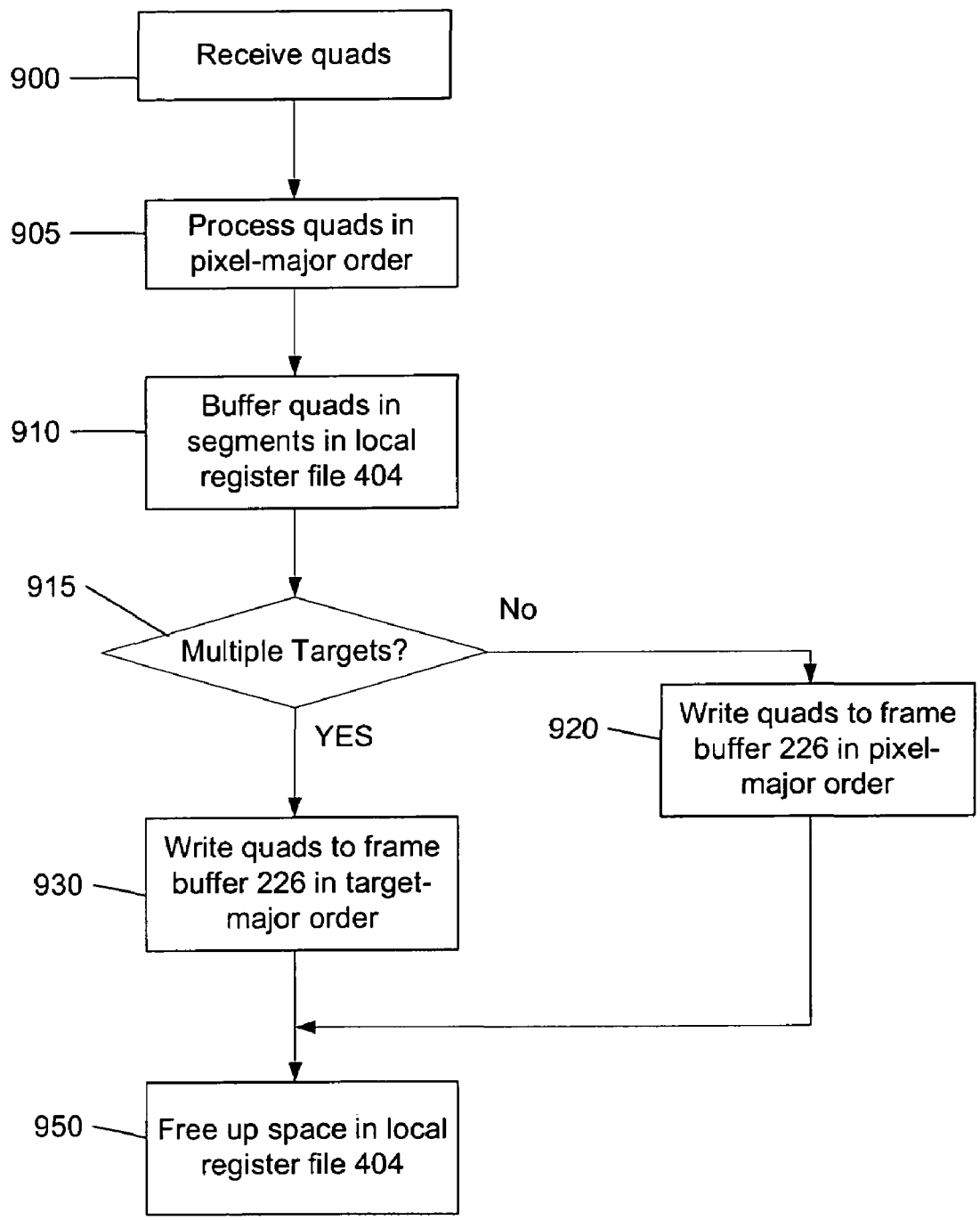
FIG. 9 illustrates a method for processing and coherently writing color values out of local register file 404 into frame buffer 226 of FIG. 7 in one embodiment in accordance with the present invention.

FIG. 9 illustrates a method for processing and coherently writing color values out of local register file 404 into frame buffer 226 of FIG. 7 in one embodiment in accordance with the present invention. At step 900, PS 705 receives quads in pixel-major order. At step 905, PS 705 processes the quads in pixel-major order to determine color vectors for the pixels of the quads. At step 910, PS 705 buffers the processed color vectors in segments in local register file 404. Colors are buffered in local register file 404 until the colors are coherently written to frame buffer 226.

At step 915, pixel controller 306 (FIG. 3) determines based on the mappings described with respect to FIG. 8 whether pixels are to be written to one or more targets in frame buffer 226. At step 920, in a single target application (e.g. the 1-to-1 mapping 800 of FIG. 8), after PS 705 has completed processing color information of a number of quads for a single output target, color values are written out from local register file 404 sequentially in the order the quads are received (referred to herein as pixel-major order). For example, with a single target 510 in frame buffer 226, registers R0-R3 contain color information for 32 pixels (8 quads) of target 510, which values are written out to frame buffer 226 in the order received. At step 950, after all pixel colors are written out of registers in local register file 404, pixel controller 306 frees the registers for use by other threads.

In contrast to a single target application, if at step 915 a multiple render target (MRT) application states a mapping of colors to multiple targets in frame buffer 226, then writing sequentially from local register file 404 to frame buffer 226 may result in inefficient, non-coherent memory accesses to frame buffer 226. In frame buffer 226, for example, render target 510 may not be in the same DRAM page as render target 515 (FIG. 7). In this case, if the first color for the first quad is written to render target 510 and the second color for the first quad is subsequently written to render target 515, then any beneficial caching properties in ROP 214 (e.g., via an on-chip pixel cache) and/or frame buffer 226 (e.g., a data cache) may be reduced or negated. With MRT, consecutively writing pixels in the order they are received (pixel-major order) can result in large strides across memory in frame buffer 226. As described above, at least a minimum amount of work should be done within a DRAM page, for example, to "cover" the overhead required in opening the DRAM page.

Therefore, in step 930 with MRT mode, rather than writing in a pixel-major sequential manner with respect to quads received and processed by PS 705 to discontinuous regions in frame buffer 226, instead, the local register file 404 is written from in a target-major order. Target-major order is sequential with respect to targets but non-sequential with respect to quads received and processed. For the first target, all buffered processed color values of the segment are written to the first target in frame buffer 226. For example, all color values of the segment (e.g., with N=64, colors for pixels 1 to N from local register file 404, a column 32 bits wide and 64 registers tall in FIG. 7) are written to target 510 in DRAM page 0. After these buffered color values are read out, values of the next target are read out and transferred to target 515 in DRAM page 4. At step 950, only after all of the buffered color values in the segment are written to frame buffer 226 are the registers in local register file 404 freed by core interface 308 for use by other threads.

Advantageously, there is little overhead involved in non-sequential writes from local register 404. The benefit of reduced overhead in frame buffer 226 is traded off with use of local register file 404 as a temporary buffer after PS 705 has completed processing. Using local register file 404 as a temporary buffer can be viewed as providing less space to be shared among threads, such that GPU 122 may need to limit the reception of unprocessed quads to start another instance of PS 705. Using local register file 404 as a temporary buffer can also be viewed as causing delays in launching of subsequent threads, such that GPU 122 may need to delay launching of another instance of PS 705.

Optimal Segment Size

The size of the segments may be determined to optimize use of local register file 404, up to a predetermined maximum size (e.g., 64 registers). If the segment size is too large, then PS 705 consumes too much of local register file 404 and reduces the number of threads that can run concurrently. On the other hand, if the segment size is too small, then efficiency for memory accesses to frame buffer 226 decreases, as described further below.

Segment size may be predetermined experimentally or determined dynamically and loaded as state information, based on various considerations. For example in some embodiments, segments start and end at boundaries defined as "packets" such that the segment size corresponds with z-buffer depth data in ROP 214. Additionally, segment size may depend upon a number of primitives to be shaded, or a number of targets in a multiple render target (MRT) application. Segment size may be determined by analysis of local register file 404 usage over a number of applications, or may be determined based on profiling a particular application. For example, an application that uses relatively simple shader algorithms might not require much space in local register file 404, so that the segment size may be set relatively large to maximize frame buffer 226 efficiency, as described further below.

In some embodiments, with respect to FIG. 2, system 200 is roughly balanced to match frame buffer 226 memory rate with pixel shader 224 with only a single render target in the Z-buffer. Therefore, with multiple render targets, frame buffer 226 becomes the throughput-limiting factor. Further, in many applications that use multiple render targets there is more data per target than in a single target application. Additionally, the multiple render target may be used for intermediate data, which further exacerbates memory throughput to ROP 214 and/or frame buffer 226. In some cases, the penalty can be severe, a factor of 8 to 10 slowdown of graphics processing in system 200.

Advantageously, selecting the appropriate segment size balances consideration of free space in local register file 404 and coherent memory accesses to frame buffer 226. Extending the principles described for coherent access to frame buffer 226, local register file 404 might buffer pixels for an entire target before writing to the target in frame buffer 226. However, this would generally require large buffers in local register file 404 to hold the pixels, because while writing out of one column of local register file 404 to write all color components to the target, the remainder of the register is not being used. For example, while writing colors for pixel 0 to target 510 from the 32 leftmost bits of registers R0 to R3, the remainder of registers R0 to R3 are not being utilized other than as buffers. In other words, before writing colors out of local register file 404 to targets in frame buffer 226, shaders in PS 705 have completed processing and the registers buffer unchanging final color values.

Therefore, as described above, one determinant of segment size is sufficient free register space in local register file 404, so that threads of PS 705 can run efficiently notwithstanding the buffered processed color values in local register file 404. In some embodiments, a segment size of 64 provides a convenient balance point between available register space for threads running in cores 302, and coherent memory writes to frame buffer 226.

Another determinant of segment size is efficient storage of data versus storage space. For example, it may not be desirable for a segment to be arbitrarily large. There may be a benefit to the segment being large enough that the accesses to one target in a segment constitute an efficient set of accesses to frame buffer 226 (e.g., enough to cover the activate plus precharge time). If the segment were much larger than this, though, the segment just adds area to the GPU 122 chip because more data has to be buffered on chip.

Buffering color vectors in local register file 404 allows coherent memory accesses to ROP 214 and/or frame buffer 226. Further, buffering color vectors in local register file 404 saves providing another dedicated buffer for the color data. In other words, since local register file 404 is provided for threads to run in cores 302, there is little downside to temporarily using the local register file 404 a holding buffer for the shader PS 705.

Alternative Embodiments

With respect to FIG. 7, in various alternative embodiments, a buffer, cache, and/or aggregator are provided downstream of local register file 404. The downstream buffer collects and temporarily stores color vectors at a rate that is efficient for PS 705 processing, and outputs buffered color vectors to frame buffer 226 at a rate that is efficient for frame buffer 226. In such embodiments, because data is not buffered or is buffered for shorter periods of time in local register file 404, segments can be made shorter in local register file 404. Basically, the downstream buffer acts as an extension of local register file 404. State machines (e.g. in core interface 308) maintain status on sizes of local register file 404 and the downstream buffer, and controls PS 705 accordingly.

In other embodiments, local register file 404 is made larger so that a relatively larger number of segments may be buffered in local register file 404 while a relatively larger number of instances of PS 705 simultaneously process color data. However, providing a larger local register file 404 consumes a larger area of silicon.

While the invention has been described with respect to specific embodiments, one skilled in the art will recognize that numerous modifications are possible. Thus, although the invention has been described with respect to specific embodiments, it will be appreciated that the invention is intended to cover all modifications and equivalents within the scope of the following claims.

What is claimed is:

1. A method of writing pixels to a frame buffer comprising:
computing a first color for a first pixel using a pixel shader;
computing a second color for a second pixel using the pixel shader;
buffering the first color and the second color in storage coupled to the pixel shader;
if the first color is rendered for more than one render target, or the second color is rendered for more than one target, then
writing the first color and the second color to the frame buffer in a target-major order, otherwise
writing the first color and the second color to the frame buffer in a pixel-major order.

2. The method of claim 1 wherein if the first color is rendered for more than one render target, or the second color is rendered for more than one target, then writing the first color comprises writing to a first substantially contiguous region in the frame buffer, and writing the second color comprises writing to a second substantially contiguous region in the frame buffer, the second region discontinuous with the first region.

3. The method of claim 1 further comprising, after writing the first color and the second color to frame buffer, freeing the storage used to buffer the first color and the second color.

4. The method of claim 1 wherein writing is based on at least a mapping between the first color and the first render target.

5. The method of claim 1 further comprising determining a segment size of pixels to be processed in the pixel shader based at least on a number of instances of pixel shaders using the storage.

6. The method of claim 1 further comprising determining a segment size of pixels to be processed in the pixel shader based at least on the number of render targets in the plurality of render targets.

7. The method of claim 1 wherein buffering the first color comprises buffering the first color as a color vector in consecutive locations in the storage.

8. A method of writing pixels from a pixel shader executing in a graphics processing unit to a frame buffer coupled to the graphics processing unit comprising:
- receiving into the pixel shader a plurality of pixels in a pixel order;
- computing a segment of first colors and a segment of second colors in the pixel shader;
- buffering the segments of first colors and second colors in storage coupled to the pixel shader;
- if the segment of first colors is computed for more than one target, or the segment of second colors is computed for more than one target, then
- writing the segment of first colors and the segment of second colors to the frame buffer in a target-major order, otherwise
- writing the segment of first colors and the segment of second colors in a pixel-major order.

9. The method of claim 8 further comprising reallocating the storage after writing the segment of first colors and the segment of second colors.

10. The method of claim 8 further comprising reading state information of a mapping between shader outputs and a plurality of render targets.

11. The method of claim 8 wherein receiving into the pixel shader the plurality of pixels comprises receiving a plurality of quads of pixels into the shader.

12. The method of claim 8 wherein buffering comprises buffering in consecutive locations in the storage.

13. The method of claim 8 further comprising loading the storage with a second plurality of pixels while substantially simultaneously writing the segment of first colors and the segment of second colors.

14. The method of claim 8 further comprising computing a size of the segment.

15. The method of claim 8 further comprising computing a size of the segment based at least on a number of instances of pixel shaders using the storage.

16. The method of claim 8 further comprising computing a size of the segment based at least on the number of render targets in a plurality of render targets.

17. A graphics processing system, comprising:
- a raster unit configured to determine a set of pixels for a graphics primitive;
- a shader unit configured to receive the set of pixels in a pixel order, compute one or more color vectors for each of the set of pixels, and buffer the color vectors as a segment in a portion of a register coupled to the shader unit;
- a raster operations unit configured to receive the pixels and store the blended pixels into a frame buffer;
- a frame buffer configured to receive pixels for a first render target, a second render target, and a third render target; and
- a pixel controller configured to read the color vectors from the register and, if one of the color vectors is rendered for more than one render target, then to write the color vectors of the segment to the first render target, to the second render target, and to the third render target in a target-major order, otherwise to write the color vectors of the segment in a pixel-major order.

18. The graphics processing system of claim 17 wherein the pixel controller is further configured to compute a size of the segment based at least on a number of instances of pixel shaders using the register file.

19. The graphics processing system of claim 17 wherein the pixel controller is further configured to determine a size of the segment based at least on a mapping of shader outputs to the multiple render targets.

20. The graphics processing system of claim 19 wherein a mapping comprises state information.

* * * * *